(12) United States Patent
Hayward et al.

(10) Patent No.: US 10,600,151 B2
(45) Date of Patent: Mar. 24, 2020

(54) AUTOMATIC DETERMINATION OF A REGION OF INFLUENCE

(71) Applicant: Apple Inc., Cupertino, CA (US)

(72) Inventors: David Hayward, Los Altos, CA (US); Alexandre Naaman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 15/173,002

(22) Filed: Jun. 3, 2016

(65) Prior Publication Data
US 2016/0358309 A1   Dec. 8, 2016

Related U.S. Application Data

(60) Provisional application No. 62/171,865, filed on Jun. 5, 2015.

(51) Int. Cl.
*G06T 3/00* (2006.01)
*G06T 1/20* (2006.01)

(52) U.S. Cl.
CPC .............. *G06T 3/0093* (2013.01); *G06T 1/20* (2013.01)

(58) Field of Classification Search
CPC ....... G06T 3/0093; G06T 1/20; G06T 7/0097; G06T 3/00; G06T 7/00; G06T 7/11; G06T 7/13; G06T 7/70; G06T 7/194; G06T 17/05; G06T 2207/20021; G06T 3/4007; G06T 7/12; G06T 7/215; G06T 11/00; G06T 11/001; G06T 2207/20104; G06T 7/0002; G06T 2207/10024; G06T 7/80; G06F 2212/7201; G06F 3/061; G06F 3/0667; G06F 13/102; G06F 21/554; G06F 2212/1016; G06F 2212/7208; G06F 2221/033; G06F 2221/2123; G06F 12/0811; G06F 12/0842; G06F 12/0844; G06F 2212/62; G06F 8/45; G09G 2340/12; G09G 3/3426; G09G 2300/0439; G09G 2330/10; H04N 19/182; H04N 13/15; H04N 13/30

See application file for complete search history.

(56) References Cited

U.S. PATENT DOCUMENTS

| | | | | |
|---|---|---|---|---|
| 9,531,970 | B2* | 12/2016 | Haji-Khamneh | ............................. H04N 5/23229 |
| 2005/0275900 | A1* | 12/2005 | Stanich | ................ H04N 1/4051 358/3.14 |
| 2009/0091615 | A1* | 4/2009 | Tan | ........................... G06T 3/00 348/125 |
| 2009/0147111 | A1* | 6/2009 | Litvinov | ............... G06T 3/4015 348/273 |
| 2013/0071028 | A1* | 3/2013 | Schiller | ................... G06T 5/003 382/180 |

(Continued)

*Primary Examiner* — Xilin Guo
(74) *Attorney, Agent, or Firm* — BakerHostetler (57) ABSTRACT

Embodiments are directed toward systems and methods segment an input image for performance of a warp kernel that executes by a graphics processing unit (GPU) the warp kernel on an array of dummy data, wherein cells of the array are populated with data representing the cells' respective locations within the array, determine, from an output array obtained from execution of the warp kernel on the dummy data, a segmentation size, and build by the GPU an output image from the input image by executing the warp kernel on the input image according to the segmentation size.

23 Claims, 7 Drawing Sheets

(56) References Cited

U.S. PATENT DOCUMENTS

| | | | |
|---|---|---|---|
| 2014/0232729 A1* | 8/2014 | Hakura | G06T 15/005 345/506 |
| 2015/0379666 A1* | 12/2015 | Redzic | G06T 1/20 345/646 |
| 2016/0179750 A1* | 6/2016 | Zhou | G06F 17/16 708/203 |
| 2016/0180501 A1* | 6/2016 | Mallet | G06T 3/0018 382/164 |

* cited by examiner

AUTOMATIC DETERMINATION OF A REGION OF INFLUENCE

CLAIM FOR PRIORITY

This application benefits from priority of application Ser. No. 62/171,865, filed Jun. 5, 2015 and entitled "Automatic Determination of a Region of Influence," the disclosure of which is incorporated herein in its entirety.

BACKGROUND

The present disclosure generally relates to graphical processing and, more particularly, to systems and methods for efficiently rendering a transformed image by automatically determining a region of influence.

Many electronic devices include graphical processing units (GPUs) for presenting graphics on an electronic display device. Within media-editing software applications, it is not uncommon to provide a variety of kernels that may be applied to transform an input image. When such kernels are applied, it is necessary for the software application to determine for a given portion of the output image the corresponding portion of the input image. The corresponding portion of the input image may be referred to as a "region of influence."

Unfortunately, as image data continues to increase in size, such software applications are becoming unable to readily determine the regions of influence for respective portions of the transformed image. In some software applications, the entire input image is processed in a single stage of the image-processing pipeline. As a result, processing times are slowed and the capacity of the GPU may be exceeded.

In light of these drawbacks, the inventors have developed improved systems and methods for efficiently rendering a transformed image by automatically determining a region of influence. By implementing the various embodiments described herein, the workload of the GPU may be significantly reduced.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Reference will now be made in detail to embodiments, examples of which are illustrated in the accompanying drawings. In the following detailed description, numerous specific details are set forth in order to provide a thorough understanding of the present technology. However, it will be apparent to one of ordinary skill in the art that the present technology may be practiced without these specific details. In other instances, well-known methods, procedures, components, and circuits have not been described in detail so as not to unnecessarily obscure aspects of the embodiments. Wherever possible, like reference numbers will be used for like elements.

Embodiments are directed toward systems and methods segment an input image for performance of a warp kernel that executes by a graphics processing unit (GPU) the warp kernel on an array of dummy data, wherein cells of the array are populated with data representing the cells' respective locations within the array, determine, from an output array obtained from execution of the warp kernel on the dummy data, a segmentation size, and build by the GPU an output image from the input image by executing the warp kernel on the input image according to the segmentation size.

Additionally, the embodiments are directed toward systems and methods for segmenting an input image for performance of a plurality of kernels that build a chain of test kernels from warp kernels in the plurality, wherein any color kernels in the plurality are inert, execute by a GPU the chain of test kernels on an array of dummy data, wherein cells of the array are populated with data representing the cells' respective locations within the array, determine, from an output array obtained from execution of the chain of test kernels, a segmentation size, and build by the GPU an output image from the input image by executing the plurality of kernels on the input image according to the segmentation size.

Figure 1:
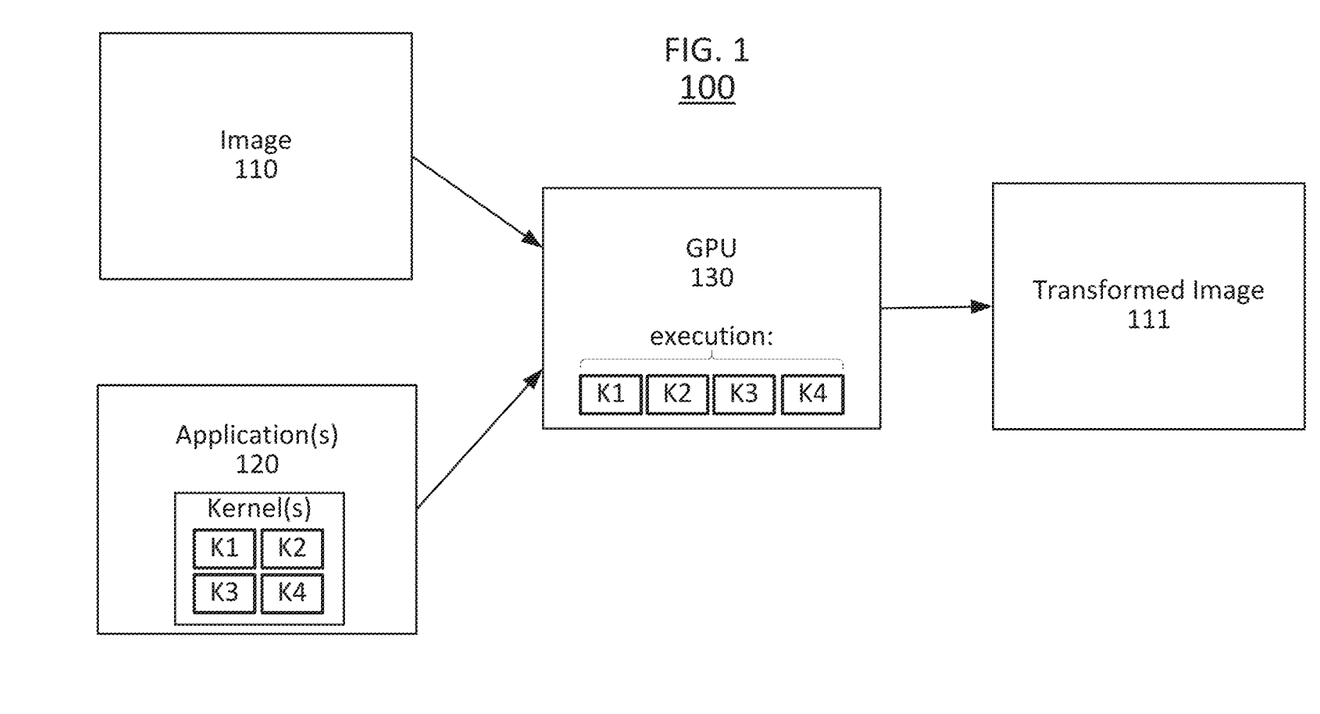
FIG. 1 is a flow diagram illustrating operation of a graphical processing system according to an embodiment of the present disclosure.

FIG. 1 is a flow diagram 100 illustrating operation of a graphical processing system according to an embodiment of the present disclosure. As shown in FIG. 1, a GPU 130 may operate on an image 110 by executing one or more kernels, such as K1-K4, on the image 110 requested by calling application(s) 120. The GPU 130 may generate a transformed image 111 following operation of the kernels K1-K4.

In practice, the GPU 130 may be part of a larger system (not shown) that includes processors and memory systems. The application(s) 120 typically execute a processor (not shown), which issues commands identifying the kernels to be executed and the image data on which they kernels should operate. The image 110 may be read from memory (not shown) and, once the transformed image 111 is created, it may be stored in memory or displayed immediately. For the purposes of the present discussion, the operation and architecture of the processors, applications and memory systems is immaterial unless discussed herein.

The GPU 130 may perform kernels of a variety of types, including warp kernels and others. A warp kernel is a kernel whose operation causes a spatial relocation of image content between the source image 110 and the transformed image 111. Exemplary warp kernels include hole distortion, light tunnel distortion, pinch distortion, twirl distortion, mirror image, and the like. Kernels that have been classified as geometric kernels and/or convolution kernels may be considered warp kernels.

Other types of kernels are available that perform transforms other than spatial relocation. For example, a wide variety of kernel(s) alter color properties of a source image but do not spatially relocate image data. Such color kernels may include a sepia filter, hue adjust filter, contrast filter, color blend, color cube, and the like.

During operation, as dictated by a requesting application 120, a GPU 130 may apply multiple kernels to an image 110 in sequence. For example, a first kernel may be applied to an image 110 followed by a second kernel. Alternatively, a concatenated kernel incorporating the multiple kernels may be applied. From a requesting application's perspective, application of a sequence of kernels may be performed as an atomic transaction, one that is performed from beginning to end without interruption.

The GPU's execution of kernels K1-K4 may be limited by the size of hardware components within the GPU 130. When a GPU 130 encounters an input image 110 that is larger than the GPU's capacity, the GPU 130 may parse the input image into a set of tiles that fit the limitations of its circuitry. In an embodiment, the GPU 130 may select a partition size according to its hardware limitation and also according to the types of kernels that are requested by the requesting application(s) 120.

FIGS. 2A-2D respectively illustrate input and transformed output images according to embodiments of the present disclosure. Each of FIGS. 2A-2D illustrates an input image and a corresponding transformed output image.

Figure 2A:
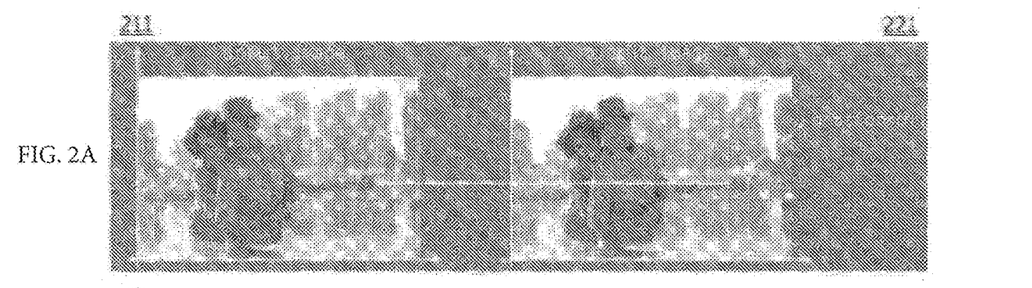
FIGS. 2A-2D illustrate input and transformed output images according to embodiments of the present disclosure.

FIG. 2A illustrates an exemplary non-warp kernel, such as a color kernel, applied to an input image 211 to generate an output image 221. In this example, each pixel location in the output image may correspond to the same pixel location in the input image. There is no spatial relocation of image content.

Figure 2B:
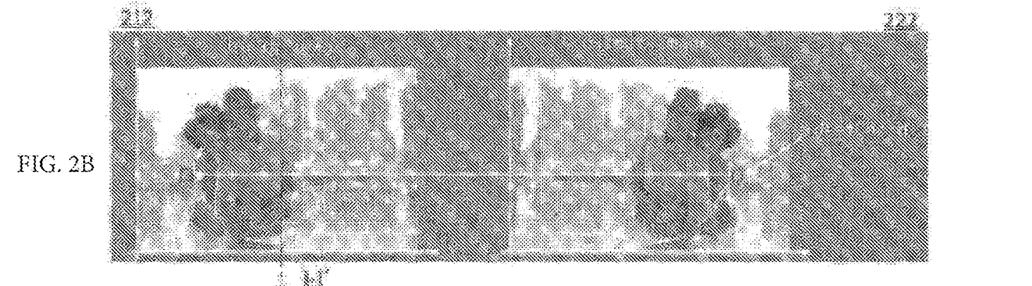

FIG. 2B illustrates an exemplary warp kernel. In this example, a "mirror" kernel is applied to the input image 212 to produce the transformed output image 222. Here, the input image has been flipped along a line i-i' extending through the center of the input image along the x axis. In this example, although the y-coordinates of pixel locations remain unchanged in the output image, the x-coordinates of the source content change in the output image. For a given pixel location in the output image, the corresponding x-coordinate in the input image may be calculated by subtracting the x-coordinate in the output image from the image width.

The example of FIG. 2B is but one example of a warp kernel. The principles of the present disclosure find application with a host of warp kernels with far more complicated transforms than are illustrated in FIG. 2B. Other warp kernels may be performed to stretch image content, twist it, and perform a variety of other spatial translations in both the x and y directions. Such warp kernels may emulate depth transforms that cause portions of the input image to appear as if they are closer in the output image than other portions. Nevertheless, for each point in the output image a warp kernel will define a portion of the input image that contributes to the image content at that point in the output image.

Figure 2C:
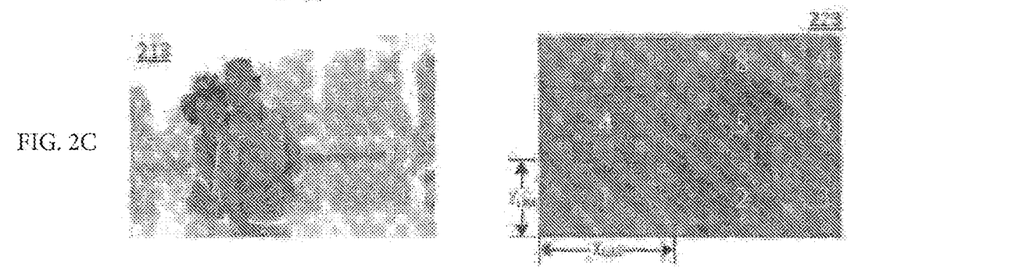
Figure 2D:
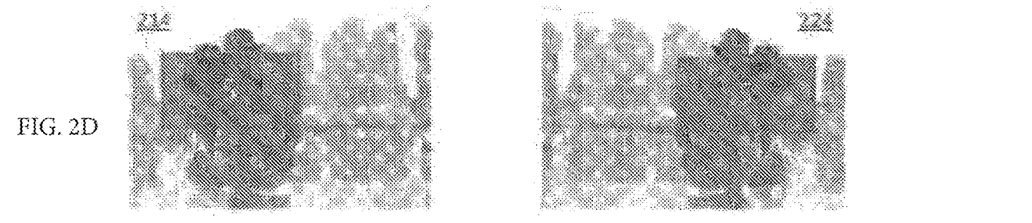

FIG. 2C illustrates segmentation of an input image 213 that may occur due to GPU limitations. For example, the output image 223 is illustrated as divided into nine segments according to a maximum segment size of $X_{LIM} \times Y_{LIM}$. In the example illustrated in FIG. 2C, to execute a non-warp transform on the input image 213, a GPU 130 could segment the input image 213 into segments no larger than $X_{LIM} \times Y_{LIM}$ and operate the kernel on the segments of the input image 213. The GPU may read segments of the input image 213 also sized according to the maximum segment size and generate corresponding segments of the output image 223. In doing so, the GPU 130 may build the output image on a segment-by-segment basis.

For a warp kernel, however, it is not guaranteed that a GPU can execute the warp kernel properly if it segments the output image 223 according to the maximum segment size of $X_{LIM} \times Y_{LIM}$. It may not be possible for the GPU to read a sufficient amount of the source image to build the output image on a segment-by-segment basis. Accordingly, embodiments of the present disclosure provide techniques for a GPU to determine dynamically, how to segment an output image to ensure that it can build the output image on a segment-by-segment basis and also ensure that a GPU reads all information necessary to build the segments of the output image in a single read operation from input image data.

For a given segment in the output image 224, the corresponding boundaries of a respective segment in the input image 214 may be calculated. In the example shown in FIG. 2D, the width and height of the segment "5" are unchanged between the output and input images. In addition, the y-coordinate of an origin of the segment may remain unchanged. For a given origin in the output image, the x-coordinate of the origin in the input image may be calculated by subtracting the x coordinate of the origin in the output image and the segment width from the image width. Such a technique may eliminate the need for an application developer, for example, to write a Region of Interest function.

Figure 3:
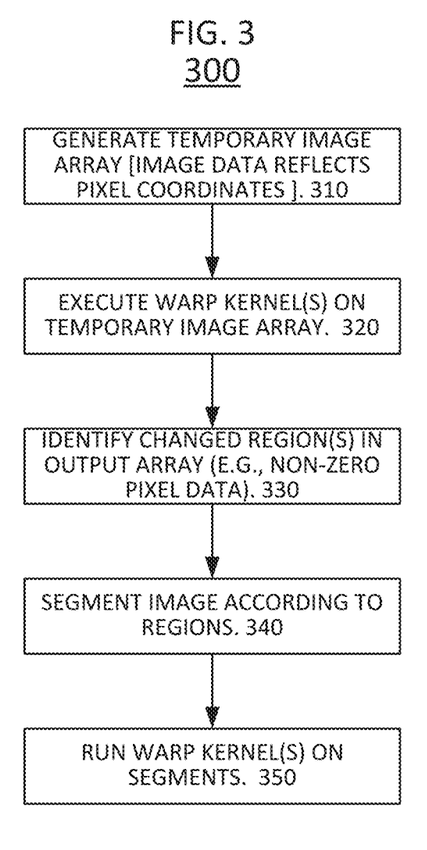
FIG. 3 illustrates a method for determining a region of influence on a transformed image according to an embodiment of the present disclosure.

FIG. 3 illustrates a method 300 for determining a region of influence on a transformed image according to an embodiment of the disclosure. Given an input image and a definition of a kernel, the method 300 may generate a temporary image array in which each pixel location is occupied by data that represents the pixel's location (box 310). The temporary image array may be a small array sized to ensure that it fits within the hardware limitations of the GPU. The method 300 may execute the requested warp kernel on the temporary image array (box 320). Execution of the warp kernel may generate an output array in which pixel locations from the source array have been relocated. Stated another way, the entries of the output array contain information that identify the locations of the input array that map to the output array.

The method 300 may identify a size of a region occupied by non-zero pixel data in the output array (box 330). By comparing a size of the temporary array and a size of the output array, the method may derive a segment size to be used in executing the requested kernel (box 340). Thereafter, the method may identify partitions of the output image to be built according to the derived segment size, and run the kernel on a segment-by-segment basis to build the output image from the input image (box 350).

Accordingly, the workload of the GPU may be significantly reduced by limiting rendering of the input image to segments corresponding to the region(s) of influence. In addition, the transformations to the output image are not compromised.

Figure 4A:
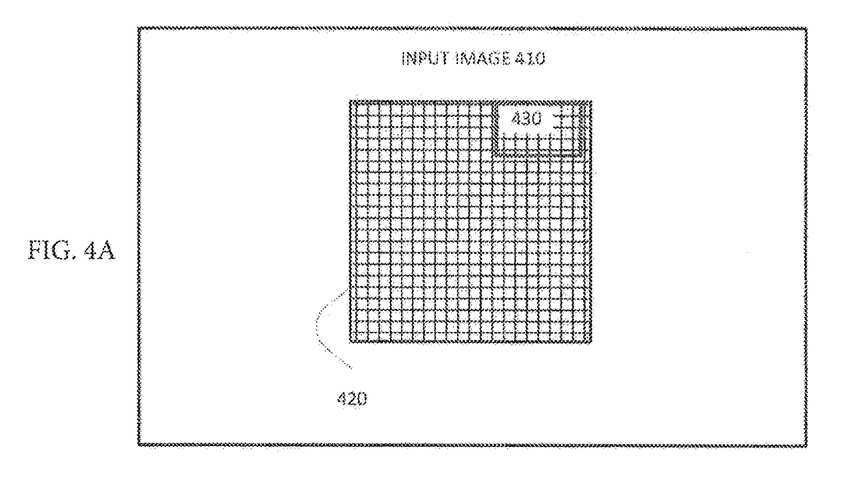
FIGS. 4A and 4B illustrate input and output images having a region of influence according to embodiments of the present disclosure.
Figure 4B:
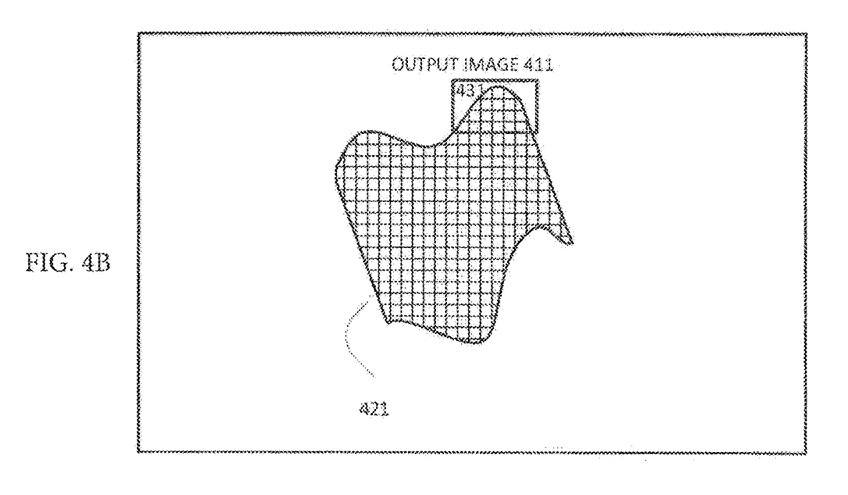

FIGS. 4A and 4B illustrate input and output images having a region of influence according to embodiments of the present disclosure. FIG. 4A illustrates an input image 410 having a region of influence 420 according to an example embodiment of the present disclosure. FIG. 4B illustrates an output image 411 having image data 421 retrieved from the corresponding region of influence 420 according to an example embodiment of the present disclosure.

As shown by comparing FIGS. 4A and 4B, a warp kernel has geometrically altered the region of influence 420 of the input image 410. As a result, the region of influence 420 has altered boundaries within output image 411.

The region of influence 420 may be identified using the methods discussed in connection with FIG. 3. For example, to generate the transformed image 411, the GPU may segment portions of the input image 410 corresponding to the region of image data 421 in the output image 411.

In some instances, especially near the boundaries of the image data 421, a more granular temporary image array may be used (e.g., 64×64 as compared to 16×16 pixels). For example, the method 300 of FIG. 3 may be re-executed using a more granular temporary image array. As shown in FIGS. 4A and 4B, a more granular temporary image array may be applied to better identify image data for region 431 from region 430 of the input image 410. This method can be executed recursively for further tessellation.

Figure 5A:
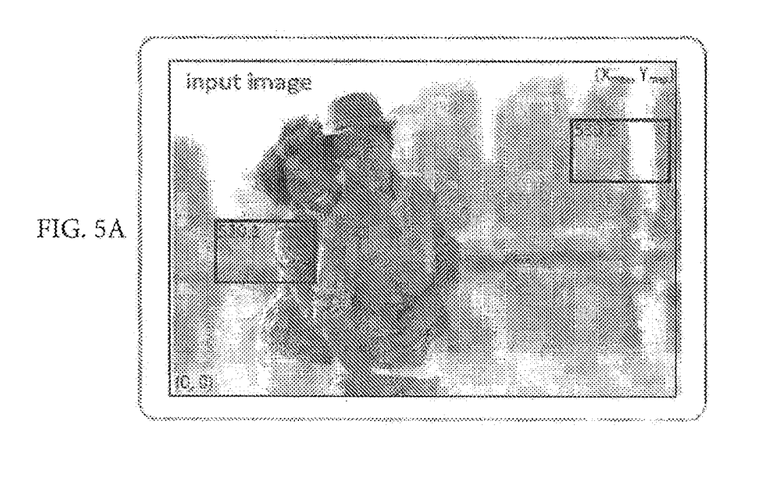
FIGS. 5A and 5B respectively illustrate an input image and a zoomed-in portion of the output image according to an embodiment of the present disclosure.
Figure 5B:
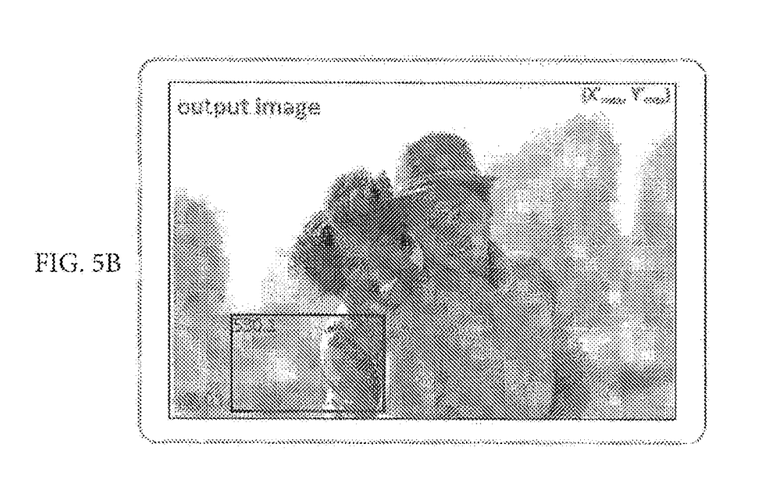

FIGS. 5A and 5B respectively illustrate an input image and a zoomed-in portion of the output image according to an embodiment of the present disclosure.

After warp kernel(s) are applied and the images are segmented, only segments of the output image that are within the display area of the host device are generated. For example, segments 530.1 and 530.2 may be located on opposite sides of the input image, as shown in FIG. 5A. In this example, of segments 530.1 and 530.2 only segment 530.1 need be generated in the output image of FIG. 5B. Accordingly, segments that are displayed on the host device may be rendered according to the warp kernel(s). By contrast, segments that are outside of the displayed portions of the image may not be rendered.

Figure 6:
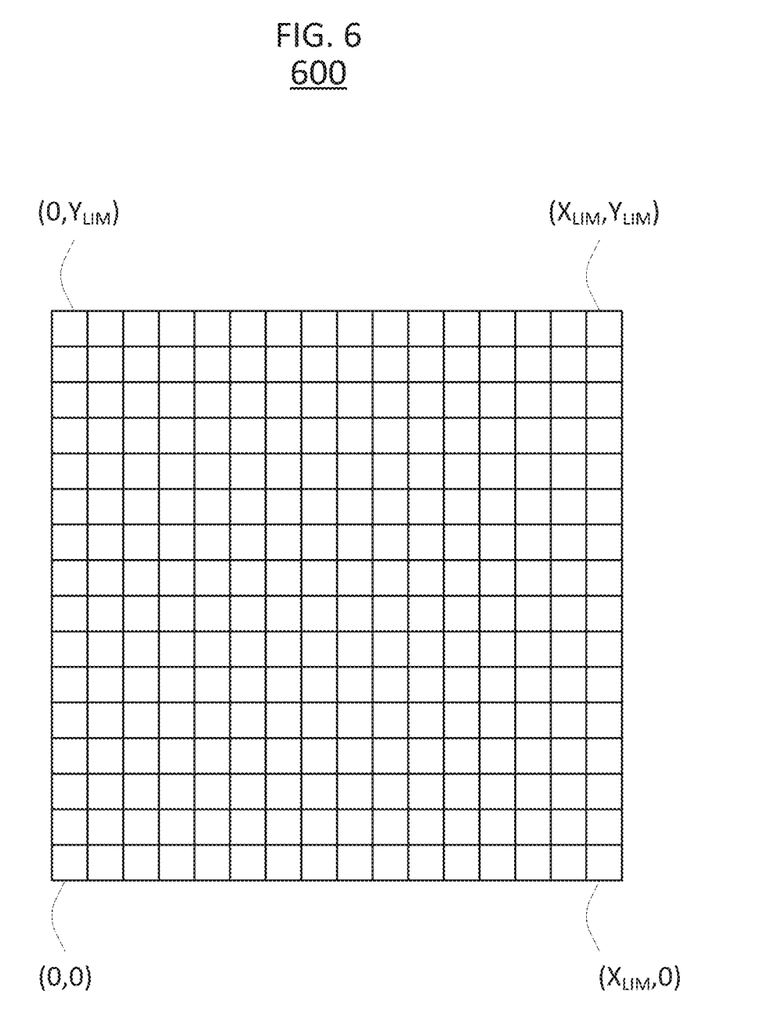
FIG. 6 illustrates a temporary image array according to an embodiment of the present disclosure.

FIG. 6 illustrates a temporary image array 600 according to an embodiment of the present disclosure. As shown, the temporary image array by have dimensions of $X_{LIM}$ by $Y_{LIM}$ pixels. In addition, the image data for each respective pixel may include coordinate data in lieu of color data.

The size of the temporary image array may vary. For example, the temporary image array may be a small (e.g., 16×16, 32×32, or 64×64 pixels) image array. In another example, the temporary image array may have a size equal to the input image. In yet another example, size of the temporary image array applied may be based on the contours of a region of influence.

Figure 7:
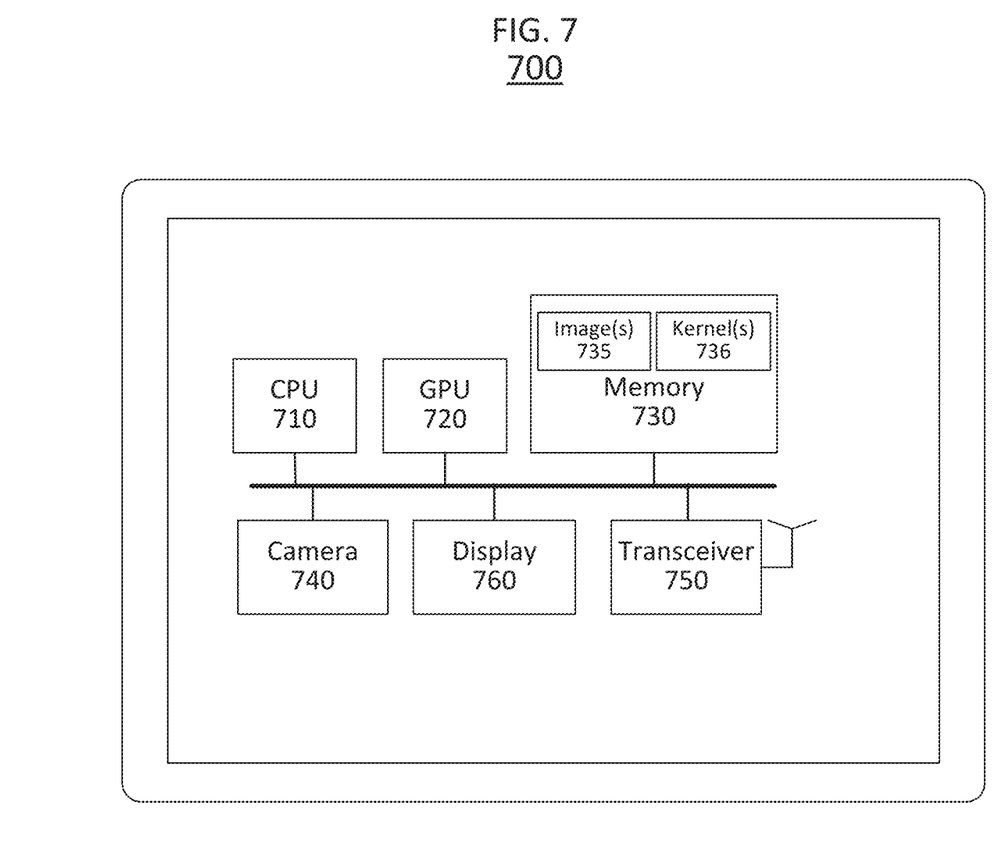
FIG. 7 is a schematic view of a host electronic device according to an embodiment of the present disclosure.

FIG. 7 is a schematic view of a client device according to an example embodiment. Client device 700 may include a CPU 710, GPU 720, memory 730 that stores images 735 and kernels 736, camera 740, transceiver 750, and display 760. The client device 700 may also include a bus that may provide a data transfer path for transferring data and/or power, to, from, or between various components of client device 700.

CPU 710 may control the operation of components within client device 700. For example, an image editing application (not shown) executed by the CPU 710 may determine the kernel(s) to be applied to an input image. In turn, the GPU 720 may execute such kernel(s) and generate a transformed output image.

Memory 730 may store the operating system (OS) of the client device 700, input and output images 735, and kernel(s) 736. Example input images may be generated by camera 740 or an image editing application, be downloaded through transceiver 750, or otherwise be retrieved by the client device 700.

In the various implementations, memory 730 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 730 may include cache memory, which may be one or more different types of memory used for temporarily storing data for electronic device applications. Memory 730 may store kernel(s) and other image editing commands, input and output images, software, firmware, wireless connection information, and the like.

Transceiver 750 may be provided to enable the client device 700 to communicate with one or more other electronic devices or servers using any suitable communications protocol. For example, transceiver 750 may support Wi-Fi (e.g., an 802.11 protocol), Ethernet, Bluetooth, high frequency systems (e.g., 900 MHz, 2.4 GHz, and 5.6 GHz communication systems), infrared, transmission control protocol/internet protocol ("TCP/IP"), hypertext transfer protocol ("HTTP"), real-time transport protocol ("RTP"), real-time streaming protocol ("RTSP"), and other standardized or propriety communications protocols, or combinations thereof.

Electronic device 700 may also include one or more output components including display(s) 760. Output components may render information (e.g., audio and video) to a user of device 700. An output component of client device 700 may take various forms, including, but not limited, to audio speakers, headphones, visual displays, etc. For example, display 760 may include any suitable type of display or interface for presenting visible information to a user of client device 700. In some embodiments, display 760 may include an embedded or coupled display. Display 760 may include, for example, a touch screen, a liquid crystal display ("LCD"), a light emitting diode ("LED") display, an organic light-emitting diode ("OLED") display, or any other suitable type of display.

In some embodiments, one or more components of electronic device 700 may be combined or omitted. Moreover, electronic device 700 may include additional components not depicted in FIG. 7. Client device 700 may be any stationary or portable electronic device, including tablet computers, smartphones, laptop computers, personal computers, set-top boxes, wearable electronic devices, and other consumer electronic products designed to execute graphics applications.

It will be apparent to those skilled in the art that various modifications and variations can be made in the systems and methods for automatically determining a region of influence of the present disclosure without departing form the spirit or scope of the technology. Thus, it is intended that the present disclosure cover the modifications and variations of this technology provided they come within the scope of the appended claims and their equivalents.

The invention claimed is:

1. A method of segmenting an input image for performance of a warp kernel, comprising:
generating an input array of cells, wherein each cell corresponds to a respective pixel in the input image, and each cell is populated with data representing the location of that cell's corresponding pixel,
executing by a graphics processing unit (GPU) the warp kernel on the input array of cells, the executing generating an output array in which pixel locations from the input array are relocated to the output array according to the warp kernel,
determining, from the output array, a segmentation size, and
building, by the GPU, an output image from the input image by executing the warp kernel on a segment of the input image according to the segmentation size.

2. The method according to claim 1, wherein the determining of the segmentation size is based on a comparison of the size of data within the input array and data within the output array.

3. The method according to claim 1, wherein the size of the input array is sized smaller than a hardware limit of the GPU.

4. The method according to claim 1, wherein executing the warp kernel on the input image spatially distorts the input image.

5. The method of claim 1, further comprising, when the warp kernel is part of a kernel chain:
the executing comprises executing warp kernels from the chain on the input array in order as they appear in the chain and omitting execution of non-warp kernels therein; and
the determining operations are performed on the output array output by a final warp kernel of the chain.

6. The method of claim 1, where the segmentation determined from the output array by including an image region that is within a display area of a display device and by not including an image region that is outside the display area of the display device.

7. The method of claim 1, wherein:
wherein the segmentation size is determined at least in part by comparing the size of the input array to the size of the output array.

8. The method of claim 1, wherein the output image is built by segmenting the output image according to the segmentation size and executing the warp kernel on a segment-by-segment basis.

9. A electronic device comprising:
a GPU; and
memory storing one or more programs for execution by the GPU, the one or more programs including instructions for:
generating an input array of cells, wherein each cell corresponds to a respective pixel in the input image, and each cell is populated with data representing the location of that cell's corresponding pixel,
executing by the GPU the warp kernel on the input array of, the executing generating an output array in which pixel locations from the input array are relocated to the output array according to the warp kernel,
determining, from an output array obtained from execution of the warp kernel on the input array, a segmentation size, and
building by the GPU an output image from an input image by executing the warp kernel on a segment of the input image according to the segmentation size.

10. The electronic device according to claim 9, wherein the determining of the segmentation size is based on a comparison of the size of data within the input array and data within the output array.

11. The electronic device according to claim 9, wherein the size of the input array is sized smaller than a hardware limit of the graphics processing system.

12. The electronic device according to claim 9, wherein the warp kernel spatially distorts the input image.

13. The electronic device according to claim 9, the instructions further comprising, when the warp kernel is part of a kernel chain:
the executing comprises executing warp kernels from the chain on the input array in order as they appear in the chain and omitting execution of non-warp kernels therein; and
the determining operations on the output array from output of a final warp kernel of the chain.

14. A non-transitory computer readable medium storing instructions for segmenting an input image for performance of a warp kernel, the instructions being executable by a graphical processing system, the non-transitory computer readable medium including instructions for:
generating an input array of cells, wherein each cell corresponds to a respective pixel in the input image, and each cell is populated with data representing the location of that cell's corresponding pixel,
executing by a graphics processing unit (GPU) the warp kernel on the input array of cells, the executing generating an output array in which pixel locations from the input array are relocated to the output array according to the warp kernel,
determining, from an output array obtained from execution of the warp kernel on the input array, a segmentation size, and
building by the GPU an output image from the input image by executing the warp kernel on a segment of the input image according to the segmentation size.

15. The non-transitory computer readable medium according to claim 14, wherein the determining of the size of the segment is based on a comparison of the size of data within the input array and data within the output array.

16. The non-transitory computer readable medium according to claim 14, wherein the size of the input array is sized smaller than a hardware limit of the GPU.

17. The non-transitory computer readable medium according to claim 14, wherein the warp kernel spatially distorts the input image.

18. The non-transitory computer readable medium according to claim 14, the instructions further comprising, when the warp kernel is part of a kernel chain:
the executing comprises executing warp kernels from the chain on the input array in order as they appear in the chain and omitting execution of non-warp kernels therein; and
the determining operations on the output array from output of a final warp kernel of the chain.

19. A method of segmenting an input image for performance of a plurality of kernels, comprising:
building a chain of test kernels from warp kernels in the plurality, wherein any color kernels in the plurality are inert,
generating an input array of cells, wherein each cell corresponds to a respective pixel in the input image, and each cell is populated with data representing the location of that cell's corresponding pixel,
executing by a graphics processing unit (GPU) the chain of test kernels on cells of the input array, the executing generating an output array in which pixel locations from the input array are relocated to the output array according to the warp kernel,
determining, from an output array obtained from execution of the chain of test kernels on the input array, a segmentation size, and
building by the GPU an output image from an input image by executing the chain of test kernels on a segment of the input image according to the segmentation size.

20. The method according to claim 19, wherein the determining of the segmentation size is based on a comparison of the size of data within the input array and data within the output array.

21. The method according to claim 19, wherein the size of the input array is sized smaller than a hardware limit of the GPU.

22. The method according to claim 19, wherein the warp kernels spatially distorts the input image.

23. The method according to claim 19, further comprising, when the warp kernel is part of a kernel chain:
- the executing comprises executing warp kernels from the chain on the input array in order as they appear in the chain and omitting execution of non-warp kernels therein; and
- the determining operations on the output array from output of a final warp kernel of the chain.

\* \* \* \* \*